C. EWING.
NUT LOCK.
APPLICATION FILED MAR. 9, 1909.

965,885.

Patented Aug. 2, 1910.

Witnesses:

Inventor:
Charles Ewing
by
Attorney

UNITED STATES PATENT OFFICE.

CHARLES EWING, OF TARRYTOWN, NEW YORK.

NUT-LOCK.

965,885.  Specification of Letters Patent.  Patented Aug. 2, 1910.

Application filed March 9, 1909. Serial No. 482,290.

*To all whom it may concern:*

Be it known that I, CHARLES EWING, a citizen of the United States, and a resident of Tarrytown, in the county of Westchester and State of New York, have invented certain new and useful Improvements in Nut-Locks, of which the following is a specification.

This invention relates to improvements in nut locks, and the main object of the invention is to provide a simple means for fastening together nuts and bolts or equivalent parts in such a manner as to prevent relative turning movement by a simple and efficient device in which are associated or combined all of the elements necessary or desirable for locking the nut and the bolt together and assuring the maintenance of such locking action.

The invention relates more particularly to nut locks in which a pawl or tongue on one of the members engages peripheral ratchet teeth or serrations on the other member.

Locking devices of this class are generally employed for the purpose of preventing relative rotation of parts which are subjected to considerable vibration, and it is important to provide locking means which will best resist the turning tendency due to vibration. I have found that it is desirable to employ means for holding the locking tongue or pawl in its locking position by combined cam and spring action in order that the power exerted by a cam may be available to assure the locking of the pawl and the ratchet-teeth or equivalent devices of the bolt firmly together, while providing for the absorption of vibration and the reduction of the strains at the pivot point of the device when the cam and tongue are embodied in a resilient cam-lever, which is the preferred construction.

The invention is illustrated in the accompanying drawing, in which—

Figure 2:
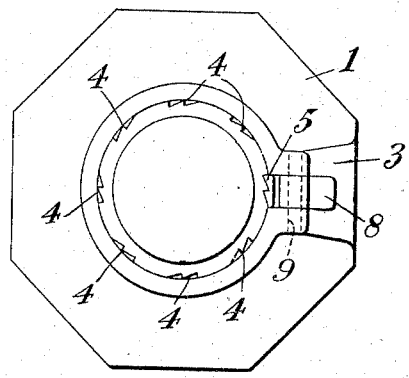
Figure 1:
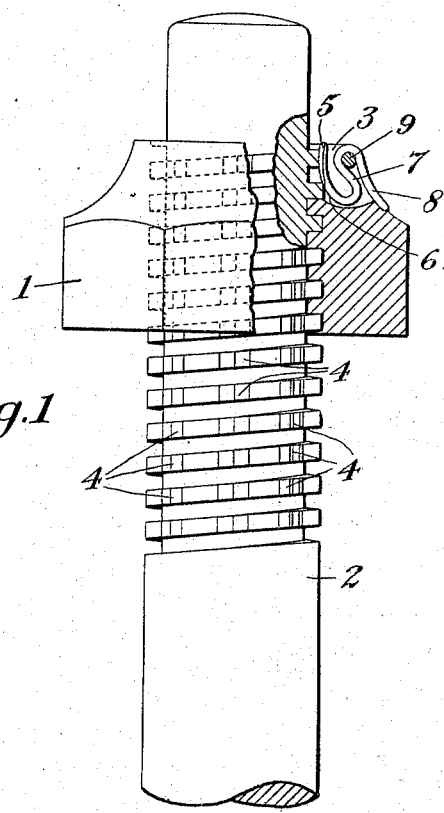

Figure 1 is a side elevation of the device in operative relation with a nut and bolt, with parts broken away to show the construction clearly, and Fig. 2 is an end elevation of the same.

1 and 2 designate a nut and a bolt or equivalent parts, which may be of any suitable type and construction so long as they are threaded internally and externally respectively to obtain a relative adjustment lengthwise of the bolt.

The nut 1 preferably carries a locking device by which it is secured to the bolt in such a manner as to prevent relative turning movement. Here the nut is recessed for the purpose of receiving the elements of the locking device, the recess illustrated being a notch intersecting both the end and the side of the nut. This recess is indicated at 3.

The locking device to be mounted in the recess 3 for coaction with the bolt 2 will comprise such elements as are believed to be most effective as means for engaging and holding the bolt. The principal elements of such a device are the locking tongue or holding pawl, which should coöperate with stops, such for example as ratchet-teeth on the bolt, and a spring cam for maintaining the pawl in engagement with such ratchet-teeth. The ratchet-teeth on the bolt are indicated here by 4. A suitable locking tongue or pawl for coöperation with said teeth is shown at 5. The spring cam employed for pressing the pawl into engagement with the teeth 4 may be either separate from or integral with the pawl 5 but is preferably formed in one piece therewith, as illustrated in the present construction.

The tongue or pawl 5, which is provided with teeth or serrations to engage the ratchet teeth, is shown as made integral with the end of a cam portion 6 formed by bending the end of a bar of spring metal. The cam so formed is eccentrically pivoted on a cross pin 9 in the recess 3, the terminal portion of the spring member, viz., the tongue portion 5, being nearer the pivot 9 than is the intermediate part of the cam portion 6. The radial distance from the curve of the spring member to the pivot 9 decreases gradually toward the end 5, so that when the nut and bolt are in the position shown in Fig. 1, the upward movement of the end 5 when it is moved into the position shown, will result in increased friction and lateral pressure between the spring cam and the bolt until the cam reaches its final position, in which the parts are tightly clamped. Considerable resiliency is given to the cam by virtue of the material from which it is made and the fact that it embodies a connecting portion 7, also a part of the spring bar or member, that connects it with the pivot 9 and supports it thereon. In this way there is provided a cam of resilient springy nature, the end portion of which is formed by an integral toothed locking tongue or pawl adapted to be forced into locking contact with the bolt by a combined cam and spring action. The opposite end of the spring member beyond the pivot 9, is preferably bent to form a lever arm 8 by means of which the resilient cam is manipulated. The unlocking of the nut is effected by a pivotal movement of the lever arm 8, this movement being a raising movement when the parts are arranged as shown in Fig. 1, and resulting in the release and withdrawal of the resilient cam.

The cam-lever just described is the preferred means employed by me for holding the nut and bolt against relative rotation, and is best made in substantially the manner illustrated in order that when in operative position there may be no projecting parts. The handle portion or lever-arm 8 of the cam-lever, it will be seen, conforms to the shape of the curved end of the nut, and the cam-lever as a whole lies within the recess 3 when in locking position. The pivot-pin 9 passes through an opening formed by sharply bending the cam-lever near the center thereof when the device is made in the manner illustrated, though it is obvious that any other type of one-piece construction will serve as well when properly made.

The locking device illustrated, though made in a single piece, combines all the functions of a lever, a cam and a spring for forcing the toothed locking-pawl 5 firmly into engagement with the corresponding teeth 4 on the bolt, it being obvious that the wedging action of the cam when turned by the lever-arm 8 about the pivot 9 is transmitted to the engaging teeth of the nut and bolt, but that the working loose of the parts and the breaking of the pivot-pin are prevented by the absorption of vibration due to the resiliency of the device. The construction is such that the locking and releasing of the nut and bolt can be effected practically instantaneously by merely manipulating the arm 8. By reason of these features the device is one which though of general application is particularly well adapted for use on motor vehicles, where the parts are subjected to violent strains and must be simple and easily manipulated in order to give good service.

What I claim is:

1. In a nut lock, the combination with a threaded bolt having longitudinal serrations, and a nut having a notch or recess therein, of a resilient cam pivoted in said notch or recess and operative to directly engage the serrations of the bolt.

2. In a nut lock, the combination of a bolt, a nut threaded thereon, and a cam fixedly pivoted on the nut to move axially of the bolt and having a portion of resilient material to press directly against the side of the bolt.

3. In a nut lock, the combination with a bolt and a nut, of a cam pivoted eccentrically on the nut and formed of a curved spring bar, the terminal portion of the cam being arranged to abut against the bolt and press against it laterally.

4. In a nut lock, the combination with a bolt, and a nut, of an eccentrically pivoted cam on the nut formed of a spring bar or member, the terminal portion of the cam being at a less distance from the pivot than the intermediate portion and provided with serrations or teeth to engage the bolt directly.

5. In a nut-lock, the combination with a threaded bolt having longitudinal serrations, of a nut, and a locking device for said bolt and nut, said locking device being a spring lever pivoted in said nut and movable in the direction of the longitudinal axis of the bolt said lever having a cam face to abut against the bolt and provided with one or more serrations adapted to engage the serrations of the bolt.

6. In a nut-lock, the combination with a threaded bolt having longitudinal serrations, of a nut, and a locking device for said bolt and nut, said locking device being pivoted in said nut and movable in the direction of the longitudinal axis of the bolt and embodying a cam-spring at one side of the pivot provided with one or more serrations adapted to engage the serrations of the bolt and having an operating handle at the other side of said pivot, said cam-spring and handle forming a unitary device.

Signed at Tarrytown, in the county of Westchester, and State of New York, this fourth day of March, A. D. 1909.

CHARLES EWING.

Witnesses:
KATHLEEN EWING,
J. G. BLAINE EWING.